US007343491B2

(12) United States Patent
Nakano

(10) Patent No.: US 7,343,491 B2
(45) Date of Patent: Mar. 11, 2008

(54) INFORMATION PROCESSING APPARATUS AND METHOD

(75) Inventor: Takehiko Nakano, Kanagawa (JP)

(73) Assignee: Sony Corporation (JP)

( * ) Notice: Subject to any disclaimer, the term of this patent is extended or adjusted under 35 U.S.C. 154(b) by 666 days.

(21) Appl. No.: 09/900,584

(22) Filed: Jul. 6, 2001

(65) Prior Publication Data

US 2002/0035690 A1    Mar. 21, 2002

(30) Foreign Application Priority Data

Jul. 6, 2000    (JP)    ............................ P2000-205615
Jul. 12, 2000   (JP)    ............................ P2000-211787

(51) Int. Cl.
  *H04L 9/00*    (2006.01)
(52) U.S. Cl. ........................... 713/171; 726/26; 726/31
(58) Field of Classification Search .............. 713/171, 713/200, 178
See application file for complete search history.

(56) References Cited

U.S. PATENT DOCUMENTS

| 5,159,633 | A | * | 10/1992 | Nakamura | .................... | 380/30 |
| 5,319,705 | A | * | 6/1994 | Halter et al. | .................... | 705/54 |
| 5,499,298 | A | * | 3/1996 | Narasimhalu et al. | ......... | 705/54 |
| 5,553,143 | A | * | 9/1996 | Ross et al. | .................... | 705/59 |
| 5,745,678 | A | * | 4/1998 | Herzberg et al. | .............. | 726/32 |
| 5,892,900 | A | * | 4/1999 | Ginter et al. | .................. | 726/26 |
| 5,905,860 | A | * | 5/1999 | Olsen et al. | .................... | 726/27 |
| 5,915,019 | A | * | 6/1999 | Ginter et al. | .................. | 705/54 |
| 5,926,624 | A | * | 7/1999 | Katz et al. | .................... | 709/217 |
| 6,055,314 | A | * | 4/2000 | Spies et al. | .................. | 380/228 |
| 6,131,162 | A | * | 10/2000 | Yoshiura et al. | ............ | 713/176 |
| 6,189,146 | B1 | * | 2/2001 | Misra et al. | .................. | 717/177 |
| 6,209,787 | B1 | * | 4/2001 | Iida | ............................ | 235/381 |
| 6,327,656 | B2 | * | 12/2001 | Zabetian | ..................... | 713/176 |
| 6,343,280 | B2 | * | 1/2002 | Clark | ........................ | 705/55 |
| 6,427,140 | B1 | * | 7/2002 | Ginter et al. | ................. | 705/80 |
| 6,477,649 | B2 | * | 11/2002 | Kambayashi et al. | ......... | 726/27 |
| 6,516,413 | B1 | * | 2/2003 | Aratani et al. | .............. | 713/170 |
| 6,519,571 | B1 | * | 2/2003 | Guheen et al. | ............... | 705/14 |
| 6,574,612 | B1 | * | 6/2003 | Baratti et al. | ................. | 705/59 |
| 6,697,944 | B1 | * | 2/2004 | Jones et al. | .................. | 713/168 |
| 6,700,989 | B1 | * | 3/2004 | Itoh et al. | .................... | 382/100 |
| 6,772,340 | B1 | * | 8/2004 | Peinado et al. | ............. | 713/168 |
| 6,785,713 | B1 | * | 8/2004 | Freeman et al. | ............ | 709/208 |
| 6,859,535 | B1 | * | 2/2005 | Tatebayashi et al. | ......... | 380/201 |
| 6,873,975 | B1 | * | 3/2005 | Hatakeyama et al. | ......... | 705/51 |
| 6,891,953 | B1 | * | 5/2005 | DeMello et al. | ............ | 380/277 |
| 6,920,436 | B2 | * | 7/2005 | Stefik et al. | .................. | 705/51 |
| 6,922,724 | B1 | * | 7/2005 | Freeman et al. | ............ | 709/223 |
| 6,950,941 | B1 | * | 9/2005 | Lee et al. | .................... | 713/193 |
| 6,968,058 | B1 | * | 11/2005 | Kondoh et al. | ............. | 380/200 |
| 7,103,574 | B1 | * | 9/2006 | Peinado et al. | ............. | 705/51 |
| 7,136,838 | B1 | * | 11/2006 | Peinado et al. | ............. | 705/59 |
| 2003/0120611 | A1 | * | 6/2003 | Yoshino et al. | ............. | 705/67 |
| 2003/0191946 | A1 | * | 10/2003 | Auer et al. | ................. | 713/182 |

* cited by examiner

*Primary Examiner*—Nasser Moazzami
*Assistant Examiner*—David Garcia Cervetti
(74) *Attorney, Agent, or Firm*—Lerner, David, Littenberg, Krumholz & Mentlik, LLP

(57) ABSTRACT

In order to limit use of content, when a source receives a request for transmitting content from a sink, the source performs an authentication process. When the authentication is successful, the source transmits to the sink key information necessary for decrypting the encryption applied to the content. The sink can receive the content by receiving the key information and by decrypting the encryption applied to the content by using the key information.

12 Claims, 7 Drawing Sheets

INFORMATION PROCESSING APPARATUS AND METHOD

CROSS-REFERENCE TO RELATED APPLICATIONS

The present application claims priority from Japanese Application Nos. P2000-205615, filed Jul. 6, 2000, and P2000-211787, filed Jul. 12, 2000, the disclosures of which are hereby incorporated by reference herein.

BACKGROUND OF THE INVENTION

The present invention relates to an information processing apparatus and method. More particularly, the present invention relates to an information processing apparatus and method in which use of content can be limited.

In recent years, network systems typified by the Internet have become popular. As a result, it is now possible for users to transmit or receive information via the Internet.

A user who wants to view or listen to authored material such as movies or music can pay to receive the authored material.

However, there is a risk that in addition to the owner, other people, who have not paid to receive authored material such as movies or music, may fraudulently view or listen to the authored material through a network such as the Internet.

Also, if illegal viewing or listening through a network continues unrestrained, the content creation and distribution business will suffer.

SUMMARY OF THE INVENTION

The present invention has been made in view of such circumstances. An object of the present invention is to prevent content from being illegally used via a network.

To this end, in one aspect, the present invention provides an information processing apparatus for transmitting content to another apparatus via a network. The information processing apparatus includes an encryption unit operable to encrypt the content; an authentication unit operable to perform an authentication procedure with the another apparatus when the another apparatus requests permission to receive the encrypted content, the authentication procedure providing an authentication result; a transmitter operable to transmit a decryption key for decrypting the encrypted content to the another apparatus based on the authentication result; a first obtaining unit operable to obtain identification information of the another apparatus based on the authentication result; a first counting unit operable to count a total number of units desiring to receive the encrypted content based on the identification information; a storage unit operable to store the identification information of the another apparatus; and a controller operable to control a total number of units approved to receive the encrypted content based on the total number of units desiring to receive the encrypted content.

The information processing apparatus may further include a second obtaining unit operable to obtain a number of additional units desiring to receive the encrypted content from the another apparatus based on the authentication result; and a second counting unit operable to count a total number of units of the another apparatus desiring to receive the encrypted content based on the number of additional units.

The information processing apparatus may further include an information updating unit operable to delete the identification information stored in the storage unit and to reset the total number of units approved to receive the encrypted content when the decryption key is changed.

In another aspect, the present invention provides a method for transmitting content from an information processing apparatus to another apparatus via a network. The method includes encrypting the content; performing an authentication procedure with the another apparatus when the another apparatus requests permission to receive the encrypted content, the authentication procedure producing an authentication result; transmitting a decryption key for decrypting the encrypted content to the another apparatus based on the authentication result; obtaining identification information of the another apparatus based on the authentication result; counting a total number of units desiring to receive the encrypted content based on the identification information; storing the identification information of the another apparatus; and controlling a total number of units approved to receive the encrypted content based on the total number of units desiring to receive the encrypted content.

In another aspect, the present invention provides a recording medium having recorded thereon a program for transmitting content from an information processing apparatus to another apparatus in a network, the program including encrypting the content; performing an authentication procedure with the another apparatus when the another apparatus requests permission to receive the encrypted content, the authentication procedure producing an authentication result; transmitting a decryption key for decrypting the encrypted content to the another apparatus based on the authentication result; obtaining identification information of the another apparatus based on the authentication result; counting a total number of units desiring to receive the encrypted content based on the identification information; storing the identification information of the another apparatus; and controlling a total number of units approved to receive the encrypted content based on the total number of units desiring to receive the encrypted content.

In the information processing apparatus, the information processing method, and the program recorded on the recording medium, content is encrypted, and when a request for reception permission is made from another apparatus, an authentication procedure is performed with the other apparatus as long as the number of receiving units does not exceed a permissible value even if the reception is permitted, and a decryption key for decrypting the encrypted content is transmitted to the other apparatus on the basis of the authentication result.

In another aspect, the present invention provides an information processing apparatus for receiving content from a first apparatus via a first network. The information processing apparatus includes a first transmitter operable to transmit to the first apparatus a request for permission to receive the content; a first authentication unit operable to perform a first authentication procedure with the first apparatus, the first authentication procedure producing a first authentication result; a receiver operable to receive from the first apparatus a first decryption key for decrypting the content based on the first authentication result; a second transmitter operable to transmit the content received from the first apparatus to a second apparatus via a second network; a second authentication unit operable to perform a second authentication procedure with the second apparatus when a request for permission to receive the content is made from the second apparatus, the second authentication procedure producing a second authentication result; a third transmitter operable to transmit a second decryption key to the second apparatus based on the second authentication result; a first obtaining unit operable to obtain identification information of the second apparatus based on the second authentication result; a first counting unit operable to count a number of units desiring to receive the content based on the identification information; a storage unit operable to store the identification information of the second apparatus; and a controller operable to control a number of units approved to receive the content based on the number of units desiring to receive the content.

The information processing apparatus of the present invention may further include a decryption unit operable to decrypt the content; and an encryption unit operable to encrypt the content decrypted by the decryption unit.

The information processing apparatus of the present invention may further include a fourth transmitter operable to transmit the number of units desiring to receive the content to the first apparatus based on the first authentication result; a second obtaining unit operable to obtain a number of additional units desiring to receive the content from the second apparatus based on the second authentication result; and a second counting unit operable to count a total number of units of the second apparatus desiring to receive the content based on the number of additional units.

The information processing apparatus in accordance with this aspect of the present invention may further include an information updating unit operable to delete the identification information stored in the storage unit and to reset the number of units approved to receive the content when the second decryption key is changed.

In another aspect, the present invention provides a method for receiving content in an information processing apparatus from a first apparatus via a first network. The method includes transmitting to the first apparatus a request for permission to receive the content; performing a first authentication procedure with the first apparatus to obtain a first authentication result; receiving from the first apparatus a first decryption key for decrypting the content based on the first authentication result; transmitting the content received from the first apparatus to a second apparatus via a second network; performing a second authentication procedure with the second apparatus when a request for permission to receive the content is made from the second apparatus, the second authentication procedure producing a second authentication result; transmitting a second decryption key to the second apparatus based on the second authentication result; obtaining identification information of the second apparatus based on the second authentication result; counting a number of units desiring to receive the content based on the identification information; storing the identification information of the second apparatus; and controlling a number of units approved to receive the content based on the number of units of units desiring to receive the content.

In another aspect, the present invention provides a recording medium having recorded thereon a program for receiving content in an information processing apparatus from a first apparatus via a network. The program includes transmitting to the first apparatus a request for permission to receive the content; performing a first authentication procedure with the first apparatus to obtain a first authentication result; receiving from the first apparatus a first decryption key for decrypting the content based on the first authentication result; transmitting the content received from the first apparatus to a second apparatus via a second network; performing a second authentication procedure with the second apparatus when a request for permission to receive the content is made from the second apparatus, the second authentication procedure producing a second authentication result; transmitting a second decryption key to the second apparatus based on the second authentication result; obtaining identification information of the second apparatus based on the second authentication result; counting a number of units desiring to receive the content based on the identification information; storing the identification information of the second apparatus; and controlling a number of units approved to receive the content based on the number of units desiring to receive the content.

In the information processing apparatus, the information processing method, and the program recorded on the recording medium, the content received from the first apparatus via the first network is transmitted to the second apparatus via the second network with the permissible number of units obtained from the first apparatus as an upper limit.

The above and further objects, aspects and novel features of the invention will become more fully apparent from the following detailed description when read in conjunction with the accompanying drawings.

DETAILED DESCRIPTION

Figure 1:
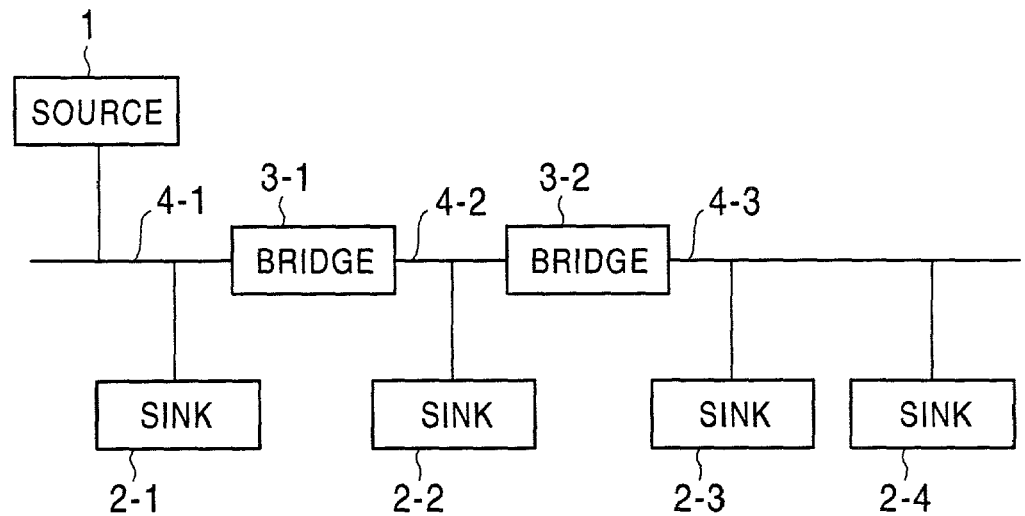
FIG. 1 is a block diagram showing an example of the configuration of a network system to which the present invention is applied.

FIG. 1 is a block diagram showing an example of the configuration of a network system to which the present invention is applied. In this network system, a source 1 is connected to a sink 2-1 and a bridge 3-1 via a bus 4-1. The bridge 3-1 is connected to a sink 2-2 and a bridge 3-2 via a bus 4-2. Furthermore, the bridge 3-2 is connected to sinks 2-3 and 2-4 via a bus 4-3.

The source 1 is an output device for outputting content. When content is to be output, the source 1 encrypts the content, then outputs the encrypted content to the sinks 2-1 to 2-4 via the buses 4-1 to 4-3. Key information necessary for decrypting the encrypted content is transferred only to the sink which has succeeded in an authentication process. As a result, the number of sinks which receive the content is limited. Since the bridges 3-1 and 3-2 (to be described later) only re-output a received signal, these are excluded from the object for which the number of units is counted.

Sinks 2-1 to 2-4 (hereinafter, when the sinks 2-1 to 2-4 do not need to be individually identified, they are referred to simply as a "sink 2", and the same applies to other devices)

are receiving units for receiving content supplied from the source 1. If a sink 2 succeeds in the authentication process, the sink 2 decrypts the received content on the basis of the key information transferred from the source 1. However, when the bridges 3-1 and 3-2 decrypt the encryption once, and encrypt with a new key and output the encrypted content, the sinks 2-2 to 2-4 decrypt the received content on the basis of the key information transferred from the bridge which is connected directly thereto.

It is assumed that the bridges 3-1 and 3-2 receive and decrypt the encrypted content which is output from the source 1, re-encrypt the content, and then output it to the sinks 2-2 to 2-4. For this purpose, the bridge 3-1 performs an authentication process with the source 1, obtains key information necessary for decrypting the encrypted content, and tells the source 1 the number of sinks 2 for which the content to be re-output is desired to be received. Then, when the bridge 3-1 obtains permission from the source 1, the bridge 3-1, instead of the source 1, limits the number of sinks 2-2 to 2-4 which receive the content. The bridge 3-2 performs an authentication process with the bridge 3-1, and similarly limits the number of sinks 2-3 and 2-4 which receive the content.

Figure 2:
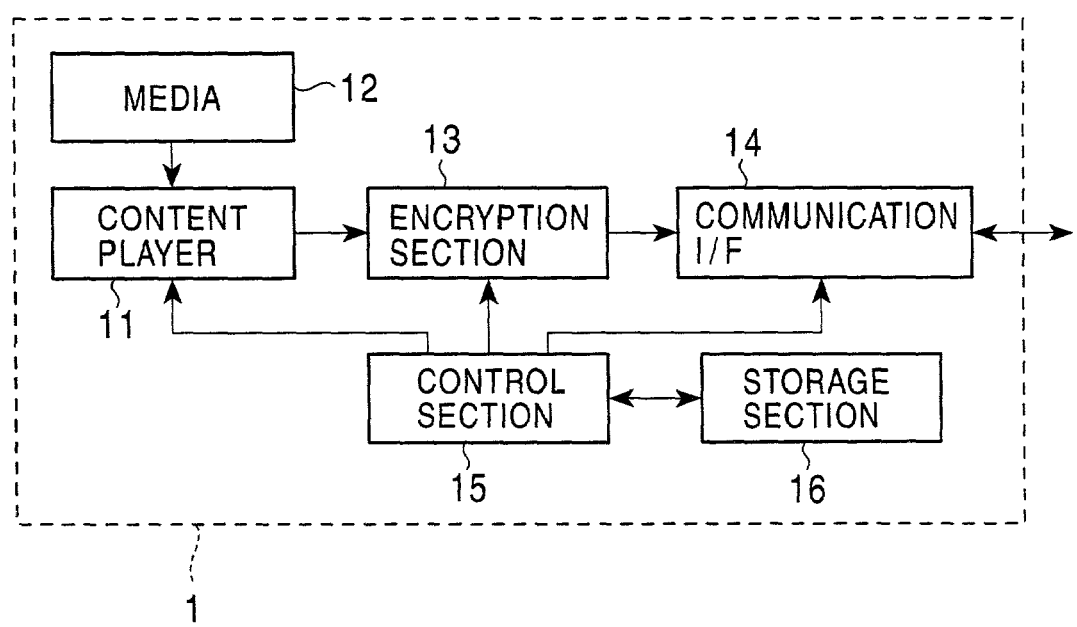
FIG. 2 is a block diagram showing a detailed example of the construction of a source of FIG. 1.

FIG. 2 is a block diagram showing a detailed example of the construction of the source 1.

When a medium 12 is loaded, a content player 11, under the control of a control section 15, plays back the content recorded on the medium 12, and outputs the content to an encryption section 13. The encryption section 13 encrypts the content input from the content player 11, and outputs it externally via a communication interface (I/F) 14. In place of the content player 11 and the medium 12, a source having a tuner which receives and outputs broadcast content may be used.

The control section 15 controls the content player 11, the encryption section 13, the communication I/F 14, and a storage section 16. Also, the control section 15 causes the content played back by the content player 11 to be stored in the storage section 16 as necessary.

Figure 3:
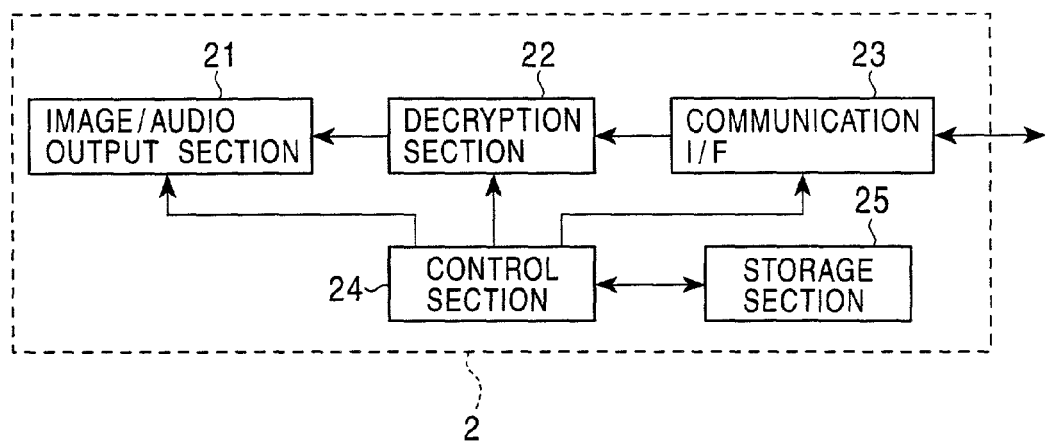
FIG. 3 is a block diagram showing a detailed example of the construction of a sink of FIG. 1.

FIG. 3 is a block diagram showing a detailed example of the construction of a sink 2.

A control section 24 controls an image/audio output section 21, a decryption section 22, a communication I/F 23, and a storage section 25. Also, the control section 24 sends the encrypted content, transmitted via the communication I/F 23, to the decryption section 22.

The decryption section 22 obtains the key information transmitted from the source 1 through the communication I/F 23. Also, the decryption section 22 decrypts the content on the basis of the obtained key information. The image/audio output section 21 outputs the content decrypted by the decryption section 22.

Figure 4:
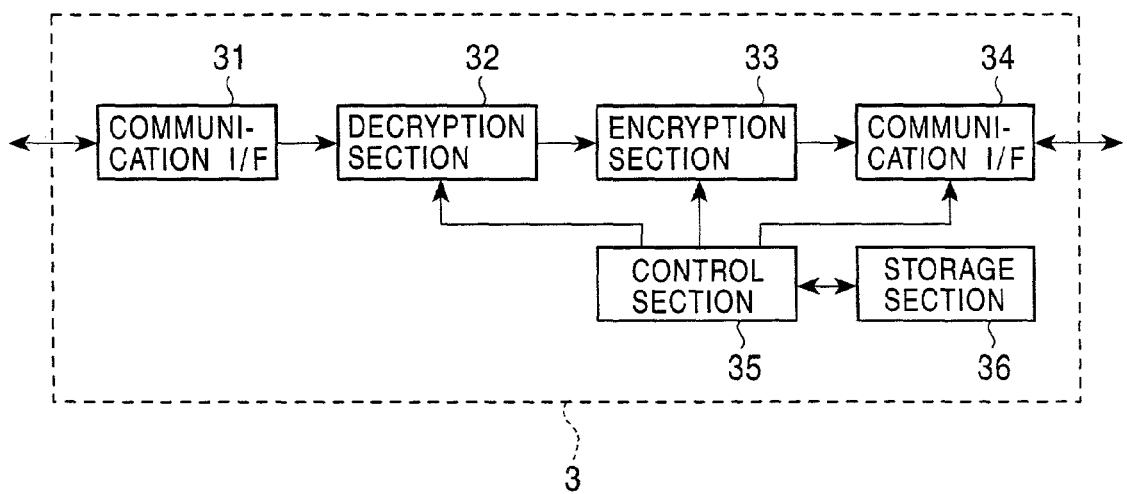
FIG. 4 is a block diagram showing a detailed example of the construction of a bridge of FIG. 1.

FIG. 4 is a block diagram showing a detailed example of the construction of a bridge 3.

A control section 35 controls a communication I/F 31, a decryption section 32, an encryption section 33, a communication I/F 34, and a storage section 36. Also, the control section 35 sends the encrypted content, transmitted via the communication I/F 31, to the decryption section 32.

The decryption section 32 obtains the key information transmitted from the source 1 via the communication I/F 31, and decrypts the received content on the basis of the obtained key information.

The encryption section 33 encrypts the content decrypted by the decryption section 32, and externally outputs it via the communication I/F 34.

It is assumed that, for authentication, public-key cryptographic technology is used, and that the source 1, the sink 2, and the bridge 3 each have a digital certificate (hereinafter referred to as a "certificate"), issued by the key management organization, a secret key, and a public key of the key management organization. It is assumed that this certificate contains a public key for each device, corresponding to the secret key for each device, the unique ID of each device, and an electronic signature for these two pieces of data supplied by the key management organization.

Figure 5:
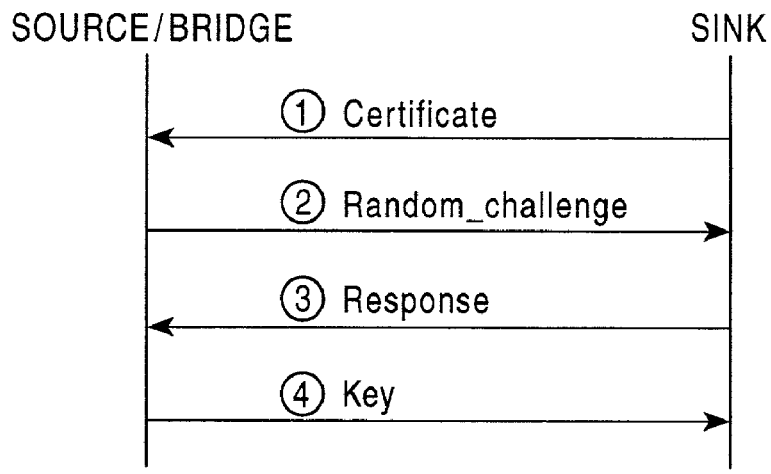
FIG. 5 is an illustration of an authentication process between a source or a bridge, and a sink.

FIG. 5 is an illustration of an authentication process in a case where the source 1 and the sink 2-1 (FIG. 1) are directly connected.

Initially, the sink 2-1 transmits its own certificate to the source. Specifically, the control section 24 of the sink 2-1 reads a certificate from the storage section 25, and transmits it as a communication command to the source 1 via the communication I/F 23 (① in FIG. 5)

When the source 1 receives this communication command, the source 1 determines whether or not the data is valid. Specifically, the control section 15 of the source 1 checks whether or not the data in the certificate received via the communication I/F 12 corresponds to the electronic signature of the key management organization attached thereto by using the public key of the key management organization stored in the storage section 16. That is, the control section 15 determines the validity of the received data by performing a DSA (Digital Signature Algorithm) verification computation process for public key encryption. If the determination result shows that the received data is valid, the authentication process continues. Otherwise, the authentication process is terminated.

If the processing continues, the control section 15 of the source 1 checks whether or not the ID of the other party in the certificate has already been entered in the authenticated ID list (hereinafter described as an "ID list") stored in the storage section 16. If the certificate has already been entered, "0" is substituted in a variable CntUp.

If, on the other hand, the ID of the other party in the certificate has not been entered in the ID list, the control section 15 of the source 1 compares the number of sinks 2 for which reception has been permitted (hereinafter described as a "variable SinkCnt") with the upper-limit number which indicates the number of receptions which are permitted (hereinafter described as a "variable MaxSink"). When the variable SinkCnt is smaller, "1" is substituted in the variable CntUp.

When SinkCnt=MaxSink, the authentication process is terminated. Also, the variable MaxSink may not be a variable (that is, it may be a constant).

Then, the control section 15 of the source 1 generates a pseudo-random number Random_challenge on the basis of a pseudo-random number generation algorithm, and transmits it as a communication command to the sink 2 (② in FIG. 5).

When the control section 24 of the sink 2-1 receives this communication command, the control section 24 performs a DSA Sign computation process for public key encryption on the value thereof by using its own secret key stored in the storage section 25 in order to calculate the electronic signature. The control section 24 of the sink 2-1 transmits the calculated electronic signature, as a communication command (Response data), to the source 1 (③ in FIG. 5).

When the control section 15 of the source 1 receives this communication command, the control section 15 determines whether or not the pseudo-random number Random_challenge transmitted by the control section 15 corresponds to this electronic signature, that is, performs the above-mentioned DSA verification computation process in order to determine the validity of the data. Here, however, in place of the above-described public key of the key management organization, the public key of the other party in the certificate received from the other party is used. When the result of the determination shows that the data is valid, the authentication process is continued. Otherwise, the authentication process is terminated.

When the processing continues, the control section 15 of the source 1 transmits to the sink 2-1, as a communication command, key information necessary for decrypting the encryption applied to the content (④ in FIG. 5), and increases the value of the variable SinkCnt by the value of the variable CntUp. Then, the control section 15 of the source 1 checks whether or not the ID of the other party in the certificate has already been entered in the authenticated ID list stored in the storage section 16. If it has already been entered, "0" is substituted in the variable CntUp. On the other hand, if the ID of the other party in the certificate has not been entered in the ID list, the variable SinkCnt is compared with the variable MaxSink, and if the variable SinkCnt is smaller, "1" is substituted in the variable CntUp.

The sink 2-1 can receive the content by receiving the key information and by decrypting the encryption applied to the content by using the key information.

Also, as in the source 1 and the sink 2-2 shown in FIG. 1, in a case where the content output from the source 1 is received by the sink 2-2 after going through the bridge 3-1, the sink 2-2 and the bridge 3-1 perform an authentication process such as that shown in FIG. 5. That is, even in a case where content is transmitted via two or more bridges as in the source 1 and the sink 2-3 or the source 1 and the sink 2-4, the source 1 and the last bridge 3-2 (the bridge which is directly connected to the sinks 2-3 and 2-4) perform similar authentication processes.

Figure 6:
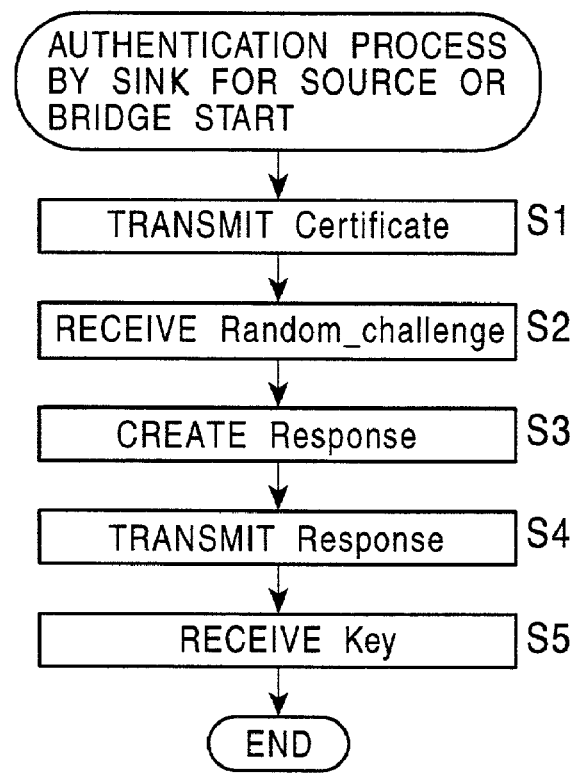
FIG. 6 is a flowchart illustrating an authentication process by the sink for a source or a bridge.
Figure 7:
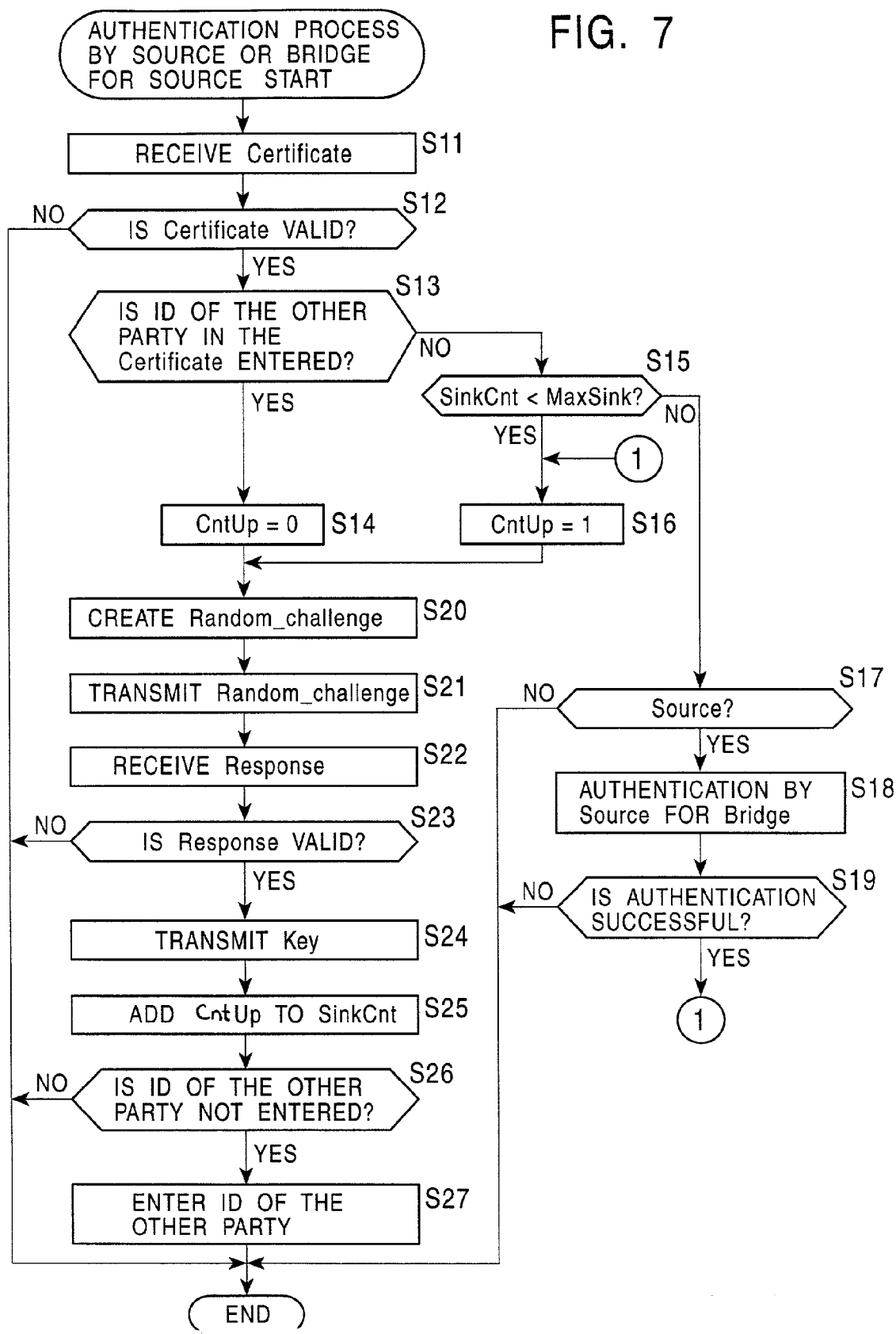
FIG. 7 is a flowchart illustrating an authentication process by a source or a bridge for a source.

The processing flow of the sink 2 in the above authentication process is shown in FIG. 6, and the processing flow of the source 1 is shown in FIG. 7.

The authentication process of the source 1 is the same as that of the case of a sink 2 even if the other party is a bridge 3. For the authentication process of the bridge 3, the process shown in step S15 of FIG. 7 differs from that in the case of the sink 2. Specifically, when SinkCnt=MaxSink, in order to increase the value of the variable MaxSink, the bridge 3 performs an authentication process for requesting reception permission from the source 1 or a bridge 3 (in the case of the example of FIG. 1, the source 1 if the bridge 3 is the bridge 3-1 and the bridge 3-1 if the bridge 3 is the bridge 3-2) which is the transmission source of the content received (input) by the bridge 3. In this case, a request for an additional increase in the number of receiving units by one or more is made. When this authentication process is successful, the processing of step S16 or subsequent steps in FIG. 7 is continued.

Figure 8:
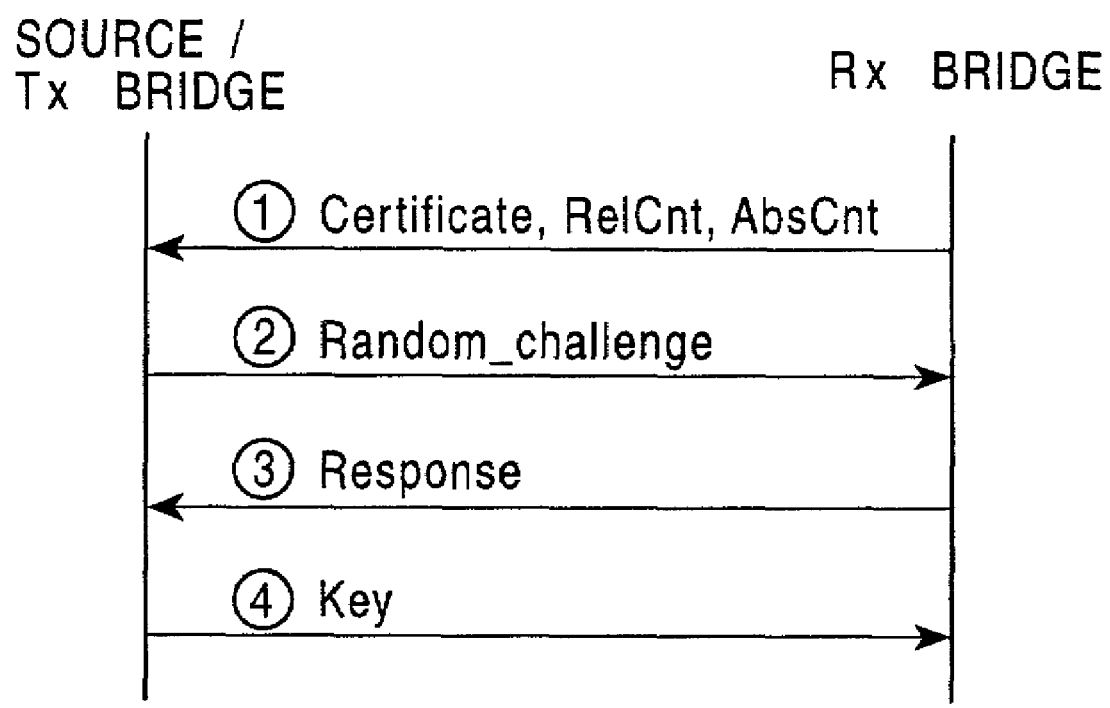
FIG. 8 is a flowchart illustrating an authentication process by a source or a Tx bridge for an Rx bridge.

FIG. 8 is an illustration of an authentication process in a case where the source 1 and the bridge 3-1 (FIG. 1) are directly connected.

Initially, the control section 35 of the bridge 3-1 transmits its own certificate, variable RelCnt, and variable AbsCnt to the source 1 (① in FIG. 8). Here, the variable RelCnt represents the number of units for which the bridge 3-1 desires to newly obtain reception permission, and the variable AbsCnt represents the total number of units for which permission has already been obtained and the number of units for which permission is desired this time.

When the control section 15 of the source 1 receives the certificate and the variables, the control section 15 determines whether or not the certificate is valid by performing the above-described DSA verification computation process. When the result of the determination shows that the certificate is not valid, the authentication process is terminated.

When the processing continues, the control section 15 of the source 1 checks whether or not the ID of the other party in the certificate has already been entered in its own ID list. If the certificate has already been entered, the variable RelCnt is substituted in the variable CntUp.

If, on the other hand, the ID of the other party in the certificate has not been entered in the ID list, the control section 15 of the source 1 substitutes the variable AbsCnt in the variable CntUp. Then, the control section 15 of the source 1 determines whether the value resulting when the variable CntUp is added to the variable SinkCnt is smaller than the variable MaxSink. When they are equal, the authentication process is terminated.

Then, the control section 15 of the source 1 generates a pseudo-random number Random_challenge, and transmits it as a communication command to the bridge 3-1 (② in FIG. 8).

When the control section 35 of the bridge 3-1 receives this communication command, the control section 35 performs the above-described DSA Sign computation process on that value, and the transmitted variable RelCnt and variable AbsCnt by using its own secret key stored in the storage section 36 in order to calculate the electronic signature. The control section 35 of the bridge 3-1 transmits the calculated electronic signature as a communication command (Response data) to the source 1 (③ in FIG. 8).

When the control section 15 of the source 1 receives this communication command, the control section 15 determines whether or not this electronic signature corresponds to the pseudo-random number Random_challenge transmitted by the control section 15 and the received variable RelCnt and variable AbsCnt, that is, determines the validity of the data by performing the DSA verification computation process. Here, however, in place of the above-described public key of the key management organization, the public key of the other party in the certificate received from the other party is used. When the result of the determination shows that the data is not valid, the authentication process is terminated.

When the processing continues, the control section 15 of the source 1 transmits, as a communication command, to the bridge 3-1 the key information necessary for decrypting the encryption applied to the content (④ in FIG. 8), and increases the value of the variable SinkCnt by the value of the variable CntUp. After this, if the ID of the other party has not been entered in the ID list, the control section 15 adds it to the list.

The bridge 3-1 receives the key information and decrypts the encryption applied to the content by using the key information, re-encrypts the content, and then outputs it. Then, the control section 35 of the bridge 3-1 increases the value of the variable MaxSink by the value of the variable RelCnt.

Figure 9:
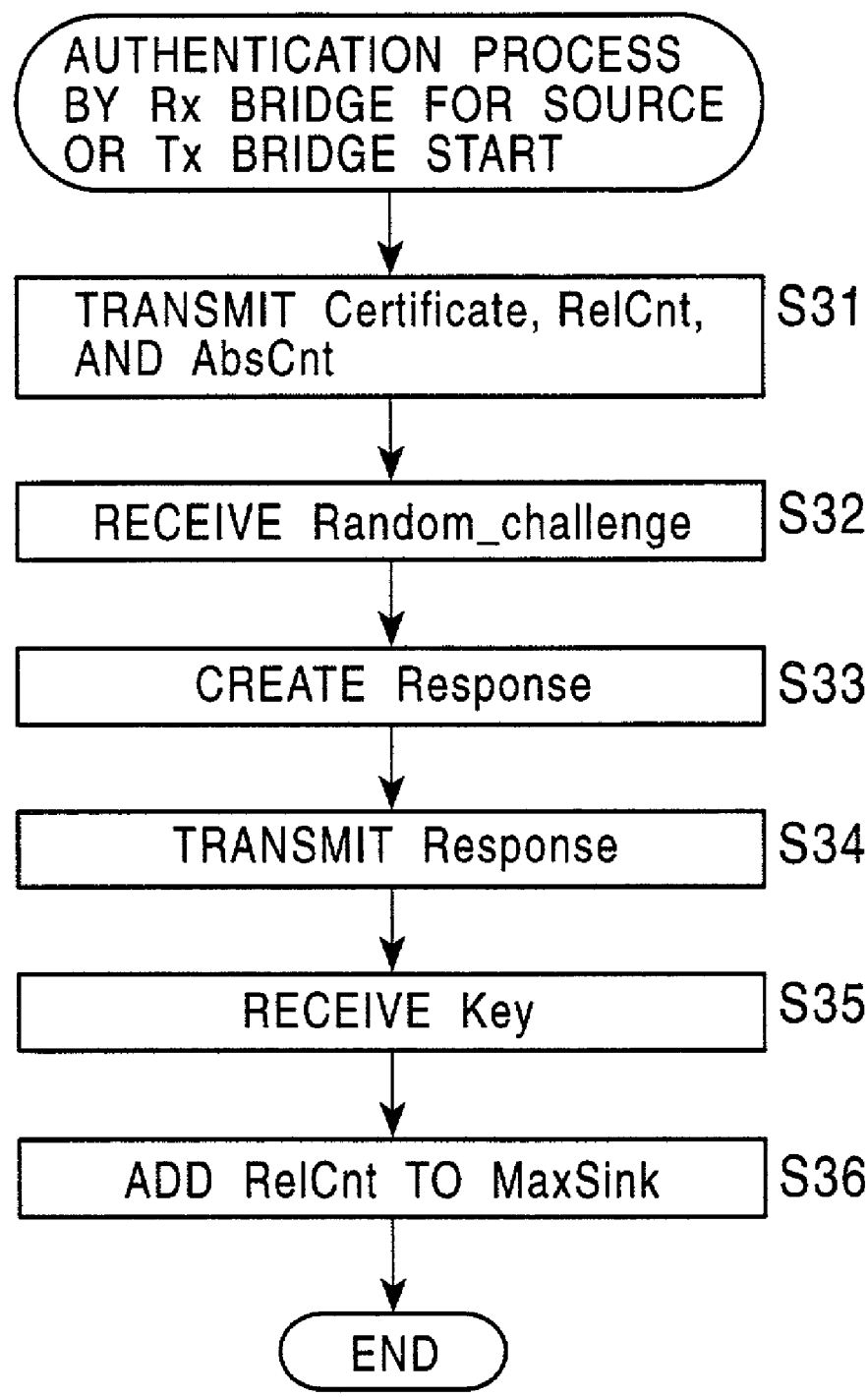
FIG. 9 is a flowchart illustrating an authentication process by the Rx bridge for the source or the Tx bridge.
Figure 10:
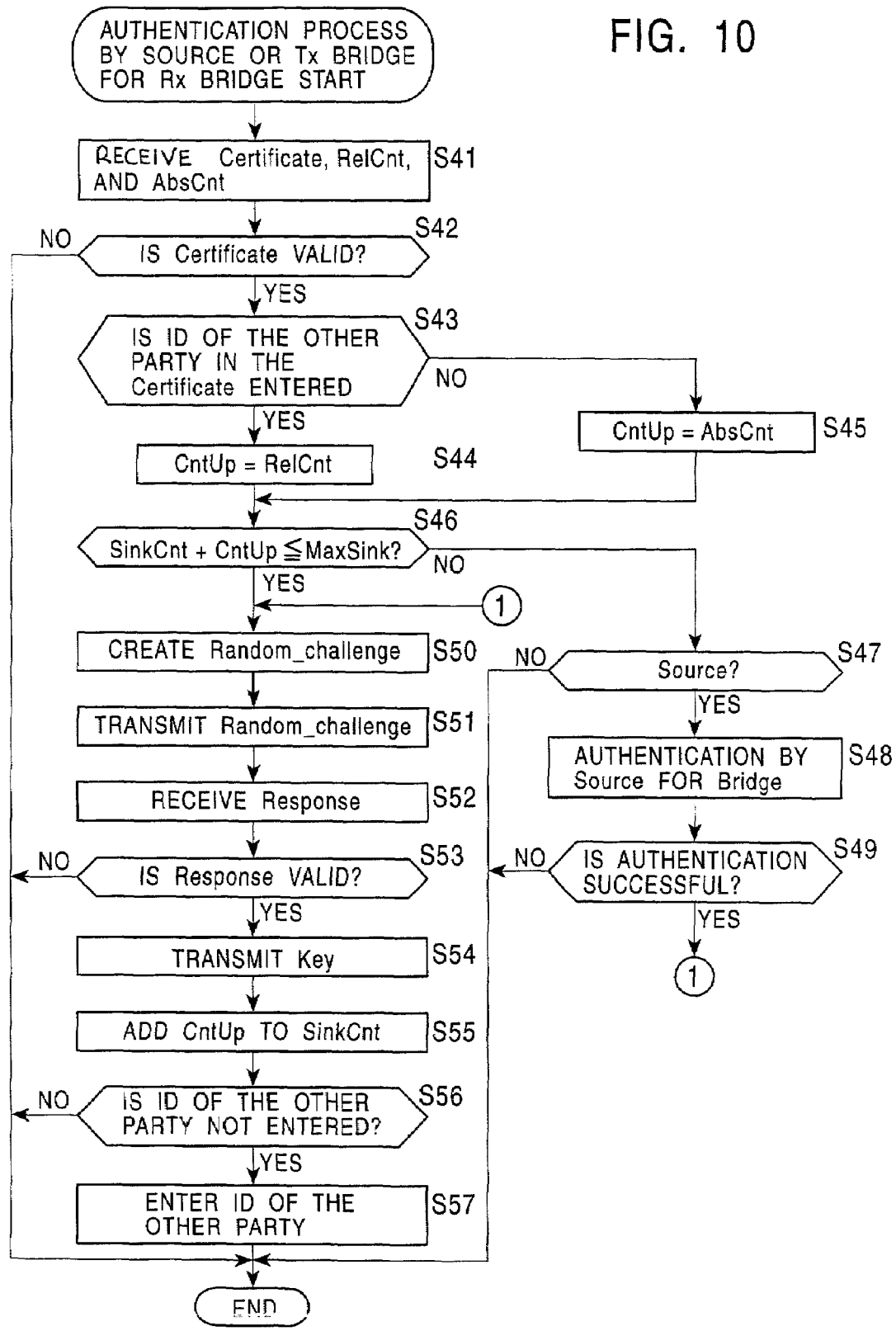
FIG. 10 is a flowchart illustrating an authentication process by the source or the Tx bridge for the Rx bridge.

The processing flow of the bridge 3 in the above authentication process is shown in FIG. 9, and the processing flow of the source 1 is shown in FIG. 10.

As in the source 1 and the sink 2-3 or the source 1 and the sink 2-4 shown in FIG. 1, in a case where the content which is output from the source 1 is received by the sinks 2-3 and 2-4 after going through two of bridges 3-1 and 3-2 or more, the bridge 3-1 which outputs the content (hereinafter described as a "Tx bridge") and the bridge 3-2 which receives it (hereinafter described as an "Rx bridge") perform an authentication process such as that shown in FIG. 8.

The authentication process of the Rx bridge is the same as that in the case where the other party is the source 1.

For the authentication process of the Tx bridge, the process shown in step S46 of FIG. 10 differs from that of the case of the source 1. Specifically, when SinkCnt+CntUp>MaxSink, in order to increase the value of the variable MaxSink, the Tx bridge performs an authentication process for requesting the source 1 or the bridge 3, which is the transmission source of the content input to the Tx bridge, to permit reception (in the case of the example of FIG. 1, the bridge 3-1 requests authentication from the source 1). In this case, a request for additional information in the number of receiving units of ((SinkCnt+CntUp)−MaxSink) or more is made. When this authentication process is successful, the processing of step S50 and subsequent steps of FIG. 10 continues.

As another processing example, a case in which the variable RelCnt and the variable AbsCnt are transmitted separately from the certificate is possible. For example, there is also a method of transmitting them together with the Response shown at ③ in FIG. 8 or transmitting them by a completely different communication command.

Also, there is a method in which in step S15 of FIG. 7 or in step S46 of FIG. 10, when the bridges 3-1 and 3-2 perform an authentication process with a newly connected source 1 or bridge 3, regardless of the result, the processing thereafter is not continued. That is, a new authentication can be considered to be one for making subsequent authentications successful.

Furthermore, in a case where the sink 2 stops receiving its own output and loses information necessary for decrypting the encryption, the source 1 or the bridge 3 can decrease the number of the variable SinkCnt by the number corresponding to the number of sinks 2. For example, when the source 1 or the bridge 3 changes the key information for the encryption to be applied to the content, it is possible for the sink 2 to set the variable SinkCnt to 0.

As described above, since the source 1 or the bridge 3 limits the number of receiving units or sinks 2 capable of receiving output, the advantages such as those described below are obtained.

(1) It is possible for the owner of content to prevent illegal viewing and recording of the content.

(2) Even when a signal is re-output using a bridge, it is possible for the source to limit the number of units, including the sink which exists at the end of the bridge.

(3) Since the limitation of the number of units is performed using an ID unique to the device, even if the same sink performs authentication many times, the number of units will not be increased by mistake.

(4) Since the increase or decrease in the number of receiving units and the total number of receiving units are informed when the bridge requests reception permission from the source or another bridge, it is possible for the source and the other bridge to easily change the variable SinkCnt to a correct value in either the case where authentication with the bridge has been performed or the case where authentication with the bridge has not been performed.

Since public-key cryptographic technology is used, the device-unique ID and the requested number of units can be safely transferred to another unit, and correct number-of-devices management can be performed.

Although the above-described series of processes can be performed by hardware, these can also be performed by software. In the case where the series of processes is performed by software, programs which form the software are installed from a recording medium into a computer incorporated into dedicated hardware or, for example, into a general-purpose personal computer capable of executing various types of functions by installing various programs.

This recording medium is constructed by not only packaged media formed of a magnetic disk (including a floppy disk), an optical disk (including a CD-ROM (Compact Disk-Read Only Memory), and a DVD (Digital Versatile Disk)), a magneto-optical disk (including an MD (Mini-Disk)), or a semiconductor memory, in which programs are recorded, but also is constructed by a ROM, a hard disk, etc., in which programs are stored, which is provided to a user in such a manner as to be preinstalled into a computer.

In this specification, steps which describe a program stored in a recording medium contain not only processing performed in a time-series manner along the described sequence, but also processing performed in parallel or individually although the processing is not necessarily performed in a time-series manner.

In this specification, the system represents the overall apparatus composed of plural devices.

Although the invention herein has been described with reference to particular embodiments, it is to be understood that these embodiments are merely illustrative of the principles and applications of the present invention. It is therefore to e understood that numerous modifications may be made to the illustrative embodiments and that other arrangements may be devised without departing from the spirit and scope of the present invention as defined by the appended claims.

The invention claimed is:

1. An information processing apparatus for carrying out secure transmission of content to another apparatus over a network, said information processing apparatus comprising:

an encryption unit operable to encrypt the content;

an authentication unit operable to receive authentication information from the another apparatus when the another apparatus requests permission to receive the encrypted content, and to determine whether the authentication information is valid;

a first obtaining unit operable to obtain identification information of the another apparatus from the authentication information when the authentication information is valid and to determine whether the identification information of the another apparatus is already stored in a storage unit;

a transmitting unit operable to transmit a decryption key needed to decrypt the encrypted content to the another apparatus when the authentication information is valid and a count of a total number of apparatuses having permission to receive the encrypted content is less than a maximum value;

a first counting unit operable to increment by one the count of the total number of apparatuses having permission to receive the encrypted content when the identification information of the another apparatus is not already stored in said storage unit and the count of the total number of apparatuses having permission to receive the encrypted content is less than the maximum value;

said storage unit being operable to store the identification information of the another apparatus when the identification information of the another apparatus is not already stored in said storage unit; and an information updating unit operable to delete the identification information stored in said storage unit and to reset the count of the total number of apparatuses having permission to receive the encrypted content when the decryption key needed to decrypt the encrypted content is changed.

2. An information processing apparatus according to claim 1, wherein the another apparatus is operable to transmit the encrypted content to a plurality of further apparatuses over the network, and said information processing apparatus further comprises:

a second obtaining unit operable to obtain a first value and a second value from the another apparatus when the authentication information is valid, the first value being a number of apparatuses in the plurality of further apparatuses that are newly requesting permission to receive the encrypted content, and the second value being a total number of apparatuses in the plurality of further apparatuses; and a second counting unit operable to increment the count of the total number of apparatuses having permission to receive the encrypted content by the first value when (i) the sum of the first value and the count of the total number of apparatuses having permission to receive the encrypted content is at most equal to the maximum value and (ii) the identification information of the another apparatus is already stored in said storage unit, said second counting unit being operable to increment the count of the total number of apparatuses having permission to receive the encrypted content by the second value when (i) the sum of the second value and the count of the total number of apparatuses having permission to receive the encrypted content is at most equal to the maximum value and (ii) the identification information of the another apparatus is not already stored in said storage unit.

3. An information processing apparatus according to claim 1, wherein the authentication information includes first authentication information and second authentication information, and said authentication unit includes:

a first authentication subunit operable to receive the first authentication information from the another apparatus when the another apparatus requests permission to receive the encrypted content, and to determine whether the first authentication information is valid; and a second authentication subunit operable to transmit a request for the second authentication information to the another apparatus when the first authentication information is valid, to receive the second authentication information from the another apparatus, and to determine whether the second authentication information is valid;

said transmitting unit being operable to transmit the decryption key to the another apparatus when the second authentication information is valid and the count of the total number of apparatuses having permission to receive the encrypted content is less than the maximum value.

4. A method for carrying out secure transmission of content from an information processing apparatus to another apparatus over a network, said method comprising:

encrypting the content;
receiving authentication information from the another apparatus when the another apparatus requests permission to receive the encrypted content;
determining whether the authentication information is valid;
obtaining identification information of the another apparatus from the authentication information when the authentication information is valid;
determining whether the identification information of the another apparatus is already stored;
transmitting a decryption key needed to decrypt the encrypted content to the another apparatus when the authentication information is valid and a count of a total number of apparatuses having permission to receive the encrypted content is less than a maximum value;
incrementing by one the count of the total number of apparatuses having permission to receive the encrypted content when the identification information of the another apparatus is not already stored and the count of the total number of apparatuses having permission to receive the encrypted content is less than the maximum value;
storing the identification information of the another apparatus when the identification information of the another apparatus is not already stored; and
deleting the stored identification information and resetting the count of the total number of apparatuses having permission to receive the encrypted content when the decryption key needed to decrypt the encrypted content is changed.

5. A method according to claim 4, wherein the another apparatus is operable to transmit the encrypted content to a plurality of further apparatuses over the network, and said method further comprises:

obtaining a first value and a second value from the another apparatus when the authentication information is valid, the first value being a number of apparatuses in the plurality of further apparatuses that are newly requesting permission to receive the encrypted content, and the second value being a total number of apparatuses in the plurality of further apparatuses;
incrementing the count of the total number of apparatuses having permission to receive the encrypted content by the first value when (i) the sum of the first value and the count of the total number of apparatuses having permission to receive the encrypted content is at most equal to the maximum value and (ii) the identification information of the another apparatus is already stored in said storage unit; and
incrementing the count of the total number of apparatuses having permission to receive the encrypted content by the second value when (i) the sum of the second value and the count of the total number of apparatuses having permission to receive the encrypted content is at most equal to the maximum value and (ii) the identification information of the another apparatus is not already stored in said storage unit.

6. A computer-readable medium having recorded thereon computer program instructions for executing a method for carrying out secure transmission of content from an information processing apparatus to another apparatus over a network, said method comprising:

encrypting the content;
receiving authentication information from the another apparatus when the another apparatus requests permission to receive the encrypted content;
determining whether the authentication information is valid;
obtaining identification information of the another apparatus from the authentication information when the authentication information is valid;

determining whether the identification information of the another apparatus is already stored;

transmitting a decryption key needed to decrypt the encrypted content to the another apparatus when the authentication information is valid and a count of a total number of apparatuses having permission to receive the encrypted content is less than a maximum value;

incrementing by one the count of the total number of apparatuses having permission to receive the encrypted content when the identification information of the another apparatus is not already stored and the count of the total number of apparatuses having permission to receive the encrypted content is less than the maximum value;

storing the identification information of the another apparatus when the identification information of the another apparatus is not already stored; and deleting the stored identification information and resetting the count of the total number of apparatuses having permission to receive the encrypted content when the decryption key needed to decrypt the encrypted content is changed.

7. A computer-readable medium according to claim 6, wherein the another apparatus is operable to transmit the encrypted content to a plurality of further apparatuses over the network, and said method further comprises:

obtaining a first value and a second value from the another apparatus when the authentication information is valid, the first value being a number of apparatuses in the plurality of further apparatuses that are newly requesting permission to receive the encrypted content, and the second value being a total number of apparatuses in the plurality of further apparatuses;

incrementing the count of the total number of apparatuses having permission to receive the encrypted content by the first value when (i) the sum of the first value and the count of the total number of apparatuses having permission to receive the encrypted content is at most equal to the maximum value and (ii) the identification information of the another apparatus is already stored in said storage unit; and incrementing the count of the total number of apparatuses having permission to receive the encrypted content by the second value when (i) the sum of the second value and the count of the total number of apparatuses having permission to receive the encrypted content is at most equal to the maximum value and (ii) the identification information of the another apparatus is not already stored in said storage unit.

8. An information processing apparatus for carrying out secure receiving of content from a first apparatus over a first network connection and for carrying out secure transmission of the content to a second apparatus over a second network connection, said information processing apparatus comprising:

a first transmitting unit operable to transmit to the first apparatus a request for permission to receive the content;

a first authentication unit operable to perform a first authentication procedure with the first apparatus;

a receiver operable to receive a first decryption key needed to decrypt the encrypted content from the first apparatus when the first authentication procedure is successful;

a decryption unit operable to use the first decryption key to decrypt encrypted content received from the first apparatus;

a reencryption unit operable to reencrypt the decrypted content;

a second authentication unit operable to receive authentication information from the second apparatus when a request for permission to receive the content is made from the second apparatus and to determine whether the authentication information is valid;

a first obtaining unit operable to obtain identification information of the second apparatus from the authentication information when the authentication information is valid and to determine whether the identification information of the second apparatus is already stored in a storage unit;

a second transmitting unit operable to transmit a second decryption key needed to decrypt the reencrypted content to the second apparatus when the authentication information is valid and a count of a total number of apparatuses having permission to receive the reencrypted content is less than a maximum value;

a first counting unit operable to increment by one the count of the number of apparatuses having permission to receive the reencrypted content when the identification information of the second apparatus is not already stored in said storage unit and the count of the total number of apparatuses having permission to receive the reencrypted content is less than the maximum value;

said storage unit being operable to store the identification information of said second apparatus when the identification information of the second apparatus is not already stored in said storage unit; and an information updating unit operable to delete the identification information stored in said storage unit and to reset the count of the number of apparatuses having permission to receive the reencrypted content when the second decryption key needed to decrypt the reencrypted content is changed.

9. An information processing apparatus according to claim 8, further comprising:

a third transmitting unit operable to transmit, to the first apparatus, the count of the number of apparatuses having permission to receive the content.

10. An information processing apparatus according to claim 8, wherein the authentication information includes first authentication information and second authentication information, and said second authentication unit includes:

a first authentication subunit operable to receive the first authentication information from the second apparatus when the second apparatus requests permission to receive the content, and to determine whether the first authentication information is valid; and a second authentication subunit operable to transmit a request for the second authentication information to the second apparatus when the first authentication information is valid, to receive the second authentication information from the second apparatus, and to determine whether the second authentication information is valid;

said second transmitting unit being operable to transmit the second decryption key to the second apparatus when the second authentication information is valid and the count of the total number of apparatuses having permission to receive the reencrypted content is less than the maximum value.

11. A method for carrying out secure receiving of content from a first apparatus over a first network connection and for carrying out secure transmission of the content to a second apparatus over a second network connection, said method comprising:
- transmitting to the first apparatus a request for permission to receive the content;
- performing a first authentication procedure with the first apparatus;
- receiving a first decryption key needed to decrypt the encrypted content from the first apparatus when the first authentication procedure is successful;
- decrypting, using the first decryption key, encrypted content received from the first apparatus;
- reencrypting the decrypted content;
- receiving authentication information from the second apparatus when a request for permission to receive the content is made from the second apparatus;
- determining whether the authentication information is valid;
- obtaining identification information of the second apparatus from the authentication information when the authentication information is valid;
- determining whether the identification information of the second apparatus is already stored;
- transmitting a second decryption key needed to decrypt the reencrypted content to the second apparatus when the authentication information is valid and a count of a total number of apparatuses having permission to receive the reencrypted content is less than a maximum value;
- incrementing by one the count of the number of apparatuses having permission to receive the reencrypted content when the identification information of the second apparatus is not already stored in said storage unit and the count of the total number of apparatuses having permission to receive the reencrypted content is less than the maximum value;
- storing the identification information of the second apparatus when the identification information of the second apparatus is not already stored; and
- deleting the identification information stored in said storage unit and resetting the count of the number of apparatuses having permission to receive the reencrypted content when the second decryption key needed to decrypt the reencrypted content is changed.

12. A computer-readable medium having recorded thereon computer program instructions for executing a method for carrying out secure receiving of content from a first apparatus over a first network connection and for carrying out secure transmission of the content to a second apparatus over a second network connection, said method comprising:
- transmitting to the first apparatus a request for permission to receive the content;
- performing a first authentication procedure with the first apparatus;
- receiving a first decryption key needed to decrypt the encrypted content from the first apparatus when the first authentication procedure is successful;
- decrypting, using the first decryption key, encrypted content received from the first apparatus;
- reencrypting the decrypted content;
- receiving authentication information from the second apparatus when a request for permission to receive the content is made from the second apparatus;
- determining whether the authentication information is valid;
- obtaining identification information of the second apparatus from the authentication information when the authentication information is valid;
- determining whether the identification information of the second apparatus is already stored;
- transmitting a second decryption key needed to decrypt the reencrypted content to the second apparatus when the authentication information is valid and a count of a total number of apparatuses having permission to receive the reencrypted content is less than a maximum value;
- incrementing by one the count of the number of apparatuses having permission to receive the reencrypted content when the identification information of the second apparatus is not already stored in said storage unit and the count of the total number of apparatuses having permission to receive the reencrypted content is less than the maximum value;
- storing the identification information of the second apparatus when the identification information of the second apparatus is not already stored; and
- deleting the identification information stored in said storage unit and resetting the count of the number of apparatuses having permission to receive the reencrypted content when the second decryption key needed to decrypt the reencrypted content is changed.

* * * * *